April 2, 1968

M. J. DEMO 3,375,889

TURBINE DRIVEN DRILL BIT

Filed Sept. 27, 1965

INVENTOR.
Max J. Demo
By Bulwinkler, Patton
Ruber, Lee, & Utecht
ATTORNEYS

April 2, 1968     M. J. DEMO     3,375,889
TURBINE DRIVEN DRILL BIT
Filed Sept. 27, 1965     2 Sheets-Sheet 2

INVENTOR.
MAX J. DEMO
BY Zulwider, Patton, Rieber
Lee, and Utecht
ATTORNEYS

United States Patent Office 3,375,889
Patented Apr. 2, 1968

3,375,889
TURBINE DRIVEN DRILL BIT
Max J. Demo, 1001 3rd St., Santa Monica, Calif. 90403
Filed Sept. 27, 1965, Ser. No. 490,486
16 Claims. (Cl. 175—106)

ABSTRACT OF THE DISCLOSURE

A rotary drill bit for drilling holes through rock, mineral and masonry structures mounted on a non-rotating supporting pipe string. The bit includes a central cutting portion concentric with its longitudinal axis and an outer cutting portion of annular form concentric with and closely surrounding the central portion without passageway therebetween. The outer portion is mounted to the pipe string through a resilient cushioning connection and the central portion is keyed to the outer portion for free limited axial movement relative thereto. Both the central and outer cutting portions have turbine means thereon through which flows the drilling mud in directions to apply contra-rotation torques to the drill bit portions which are positively connected together to insure their contra-rotation at constant relative speeds. Opposed horizontal surfaces on the drill bit portions have interfering balls mounted therein which engage and disengage on contra-rotation of the drill bit portions to give rapid repeated impacts to the drill bit cutting portions for transmittal therefrom to the drilling surface of the bore being drilled.

---

The present invention relates generally to vibrating and impacting rotary drill bits, and more particularly to a rotary drill bit which is subjected to impacts as an incident to its rotation. In its specific embodiment, the drill bit of the present invention is rotated by a substantially turbine action, while the drill bit is mounted at the end of a relatively non-rotating pipe string.

Still more specifically, a preferred embodiment of the invention employs central and rim drill bit portions which are rotated in opposite directions by the feed through turbine-like ejection passages of drilling mud or other fluid such as water or air.

In the application of the preesnt invention to drill bits for drilling holes through rock, mineral and masonry structures, such as for wells or other passages through formations of the earth's crust, rotary drill bits are subjected to great stress and wear, particularly in drilling through hard rock-like formations. The drill bits must be frequently retracted from the drill hole for inspection, repair and replacement and, in drilling deep holes, the operation of pulling out the drill bit and accompanying disassembly of the drive pipe becomes time consuming and expensive. Also the drilling rate with present non-impacting drill bits becomes quite slow when hard rock formations are encountered and the combination of slow drilling rate and down time for removal and insertion of the bit greatly increases the cost of the drilling operation.

Further in accordance with the present invention, when the well bore is inclined, as in reaching a point vertically offset from the surface, or in avoiding a particular obstruction through which the well bore would otherwise pass, the drive pipe strings of drills directly rotated thereby are repeatedly flexed at points of linear departure which not only increases the difficulty of the feed, but may deleteriously affect the drive pipe, as by fatigue or direct physical damage.

The drill bit of the present invention operates at high efflicency, increases the speed of the drilling operation and has less downtime, while the load, wear and damage to the supporting string of pipe is greatly reduced, since the pipe serves only as a conduit and a regulating vertical support for pressure on the bit and the drill is self-driven independent of the supporting string which does not rotate.

In addition to its self-driving feature, the drill bit of the present invention is preferably made with independent central and rim portions which are desirably interlocked to rotate in opposite directions under the action of the operating fluid. The rotary cutters of the drill bit of the present invention also desirably not only cut and tear the drilling surface to advance the hole, but impart to the surface a plurality of rapid impacts as an incident to the contra-rotation of the bit. These impacts not only force the cutting elements into the drilling surface, but are also believed to set up shock waves which crystallize rock material beyond the cutting surfaces, so that it may more readily be separated from the main body through which the hole is being drilled.

In an exemplary embodiment of the invention illustrated in the drawing, the central cutting portion of the bit may have its cutting surface in the form of an exteriorly slightly conical disc about which there is disposed a cutting annulus whose surface in general follows the slightly conical cutting surface of the center disc. The center disc and the outer annulus may each be driven by the working fluid as turbines and the two are desirably interconnected or meshed together to insure contra-rotation of the two portions of the bit. This inhibits jamming of one portion of the bit while the other performs its cutting operation and adds the turbine effect of each to the other to break any tendency of one portion to jam.

It will be appreciated that the load placed upon the bit and the speed of its cutting operation are determined by the weight of the pipe string thereabove or the force which may be applied thereto and that should the total force applied to the bit exceed the self-rotating turbine power thereof, stalling can be inhibited by lessening the force applied to the bit by the pipe string.

The contra-rotating drill bit portions are provided with interfering elements which cause rapid axial relative movement between the portions, thereby subjecting them to rapidly repeated impacts which are in turn transmitted by the cutting elements of the bit to the drilling surface. The cutting elements are not only forced by these impacts into the drilling surface, but are also believed to set up rapid shock waves of a frequency to crystallize the rock material beyond the drilling surface so that it may more readily be separated from the main body of the material on which the cutting elements of the drill bit portions operate. The cutting, tearing and crystallizing actions all occur as an incident to the rotation of the drill bit and interact to increase the efficiency and speed of the cutting operation. The operation is also believed to be assisted in the illustrated embodiment by the interconnected, contra-rotating portions of the drill bit which desirably are related by area and radial distance to exert like forces at the contra-rotating portions of the bit.

It is therefore an object of the present invention to provide an improved rotary drill bit for rock, mineral and masonry structures.

Another object of this invention is the provision of an improved drill bit for rock-like materials operating with increased speed and efficiency and with less wear.

Another object of this invention is the provision of an improved drill bit for rock-like materials in which the bit is self-rotated by the turbine action of a working fluid and in which the cutting elements of the bit are rapidly and repeatedly impacted against the surface being cut as an incident to the rotation of the drill bit.

A further object of this invention is the provision of an improved rotary drill bit having central and rim portions interconnected for contra-rotation about the axis of the bore being drilled.

A still further object of this invention is the provision of an improved rotary drill bit having central and rim portions interconnected for contra-rotation about the axis of the bore being drilled in which the drill bit portions are self-rotated by turbine action of a working fluid, such as a drilling mud, water, air or the like.

Yet another object of this invention is an improved rotary drill bit in accordance with the two immediately preceding objects, in which rapid and repeated impacts are applied by the cutting elements of the drill bit to the material being cut as an incident to the rotation of the drill bit portions.

These and other objects and features of the invention will be readily apparent to those skilled in the art from the following specification and the appended drawings in which.

Figure 3:
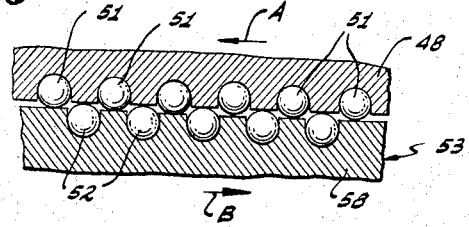
Figure 4:
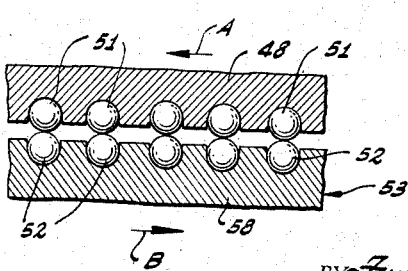

FIGURE 3 is a detail vertical sectional view, developed into a plane, showing the interfering elements on the contra-rotating drill bit portions which give impacting movements to the drill bit, the elements being shown in noninterfering relation; and FIGURE 4 is a view similar to FIGURE 3, but showing the elements in maximum interfering relation, that is, with maximum separation between the relatively axially movable portions of the bit.

The exemplary embodiment of the present invention selected for illustration and description herein is indicated generally at 11. It includes a relatively stationary, tubular member 12 which is connected directly to the pipe string, as at 13, by interengaging threaded portions 14. Within the generally tubular member 12 is a second non-rotating, generally tubular part 15 having a flange 16 thereon received in an annular pocket between a horizontal annular surface 17 on the stationary member 12 and a frusto-conical part 18 threaded into the member 12 as at 19. Between the inner surface of the frusto-conical part 18 and the internal non-rotating part 15 are disposed a plurality of resilient rings 21 which absorb shock and permit limited relative axial movement between the members 15 and 12. A sealing ring 22 is disposed between parallel, adjacent, cylindrical surfaces of member 12 and part 15 and they are interconnected by pins 23 which permit limited axial movement between member 12 and part 15, while preventing relative rotation therebetween.

Rigidly secured as at 24 to the lower interior portion of the part 15 is a non-rotating member 25 sealed thereto as by a ring 26. In the member 25 are supported shafts 27 of a number of conical idler gears 28 spaced peripherally about the member 25. The idler gears 28 serve to interconnect the contra-rotating portions of the drill bit as will be apparent hereinafter.

A sleeve 31 is rotatably mounted about the lower portion of the member 25 and sealed thereto at 32. The upper end of the sleeve 31 has an integral flange 33, the upper surface of which forms a bevel gear 34 meshing with the conical gears 28. Above the conical gears 28 and also meshing therewith is a bevel gear ring 35.

Outside of the sleeve 31 and the bevel and conical gears is an outer rotating sleeve 36 having a generally tubular portion 37 and a conical skirt 38 depending therefrom. The bottom of the skirt 38 has a threaded portion 39 on which may be rigidly secured an annular cutting ring 41 having cutting elements 42 at its cutting surface. Alternatively, the cutting ring 41 may be integral with the rotating sleeve 36 although the separate ring connection provides for replacement of the cutting portion of the sleeve without replacing the entire sleeve.

The cylindrical portion 37 of the sleeve 36 has an interiorly projecting flange 43 to the undersurface of which the bevel ring gear 35 is rigidly connected, as by studs 44. The sleeve 36 is sealed to the part 15 by a sealing ring 45 and bearing balls 46 and 47 cooperate between the sleeve 36 and the part 15 for horizontal and vertical rolling bearing therebetween.

A ring 48 is threaded into the sleeve 36 beneath the flange 33 on the sleeve 31 and has a ball bearing engagement with the flange at the balls 49. Pocketed in the undersurface of the ring 48 is a plurality of annularly spaced impacting balls 51. A sleeve 53 is keyed to the sleeve 31 by the balls 54 and the slot 55 so that the sleeves 31 and 53 rotate together but are relatively axially movable. The adjacent surfaces of the sleeves 31 and 53 are sealed by a sealing ring 56. A flange 58 on the upper end of sleeve 53 is disposed immediately beneath the ring 48 and has plurality of annularly spaced impacting balls 52 pocketed in its upper surface. The balls 51 and 52 interfere as flange 58 and ring 48 rotate in opposite directions to produce relative axial movement between the flange and ring and the rapid repeated impacts to the drill bit. A ring 57 is rigidly mounted interiorly of the sleeve 36 beneath the flange 58 on the sleeve 53 and is sealed to the sleeve 53 by a sealing ring 59. Bearing balls 61 and 62 provide for rolling interengagement between the adjacent surfaces of the ring 57 and the sleeve 53 in horizontal and vertical directions, respectively.

Rigidly secured to the lower end of the sleeve 53 at 60 is an inner turbine ring 63 through which the drilling mud or other operating fluid passes from the interior bore of the bit and the pipe string. The turbine ring 63 may be integral with the central cutting elements 65 of the drill bit, or these may be separately mounted thereon as a unit for easy replacement at 64. As illustrated, the central cutting portion of the drill bit may be a slightly conical, disc-like form with a circular periphery.

The drill bit thus far described has a central bore 66 which communicates with the interior of the pipe string for the passage of drilling mud or other operating fluid under pressure to the bit. The bore 66 is in direct communication at its bottom with offset, inclined turbine passages 67 through the ring 63 through which the operating fluid passes to impart a rotary torque to the ring 63 and the parts mounted thereon in a counterclockwise direction, as viewed in FIGURE 2.

Figure 1:
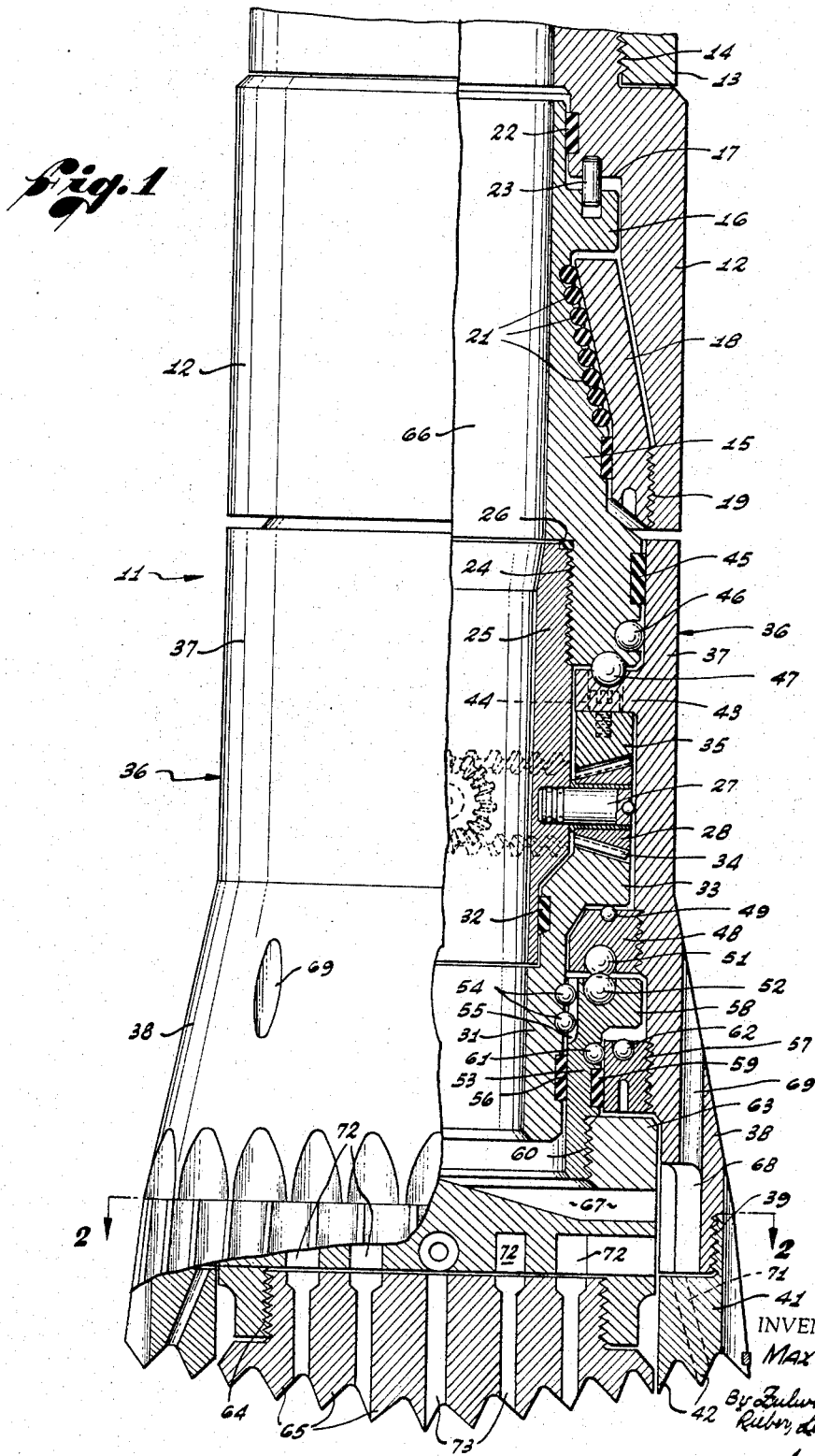
FIGURE 1 is a vertical elevational view, partly in section of an exemplary embodiment of a drill bit according to the present invention.
Figure 2:
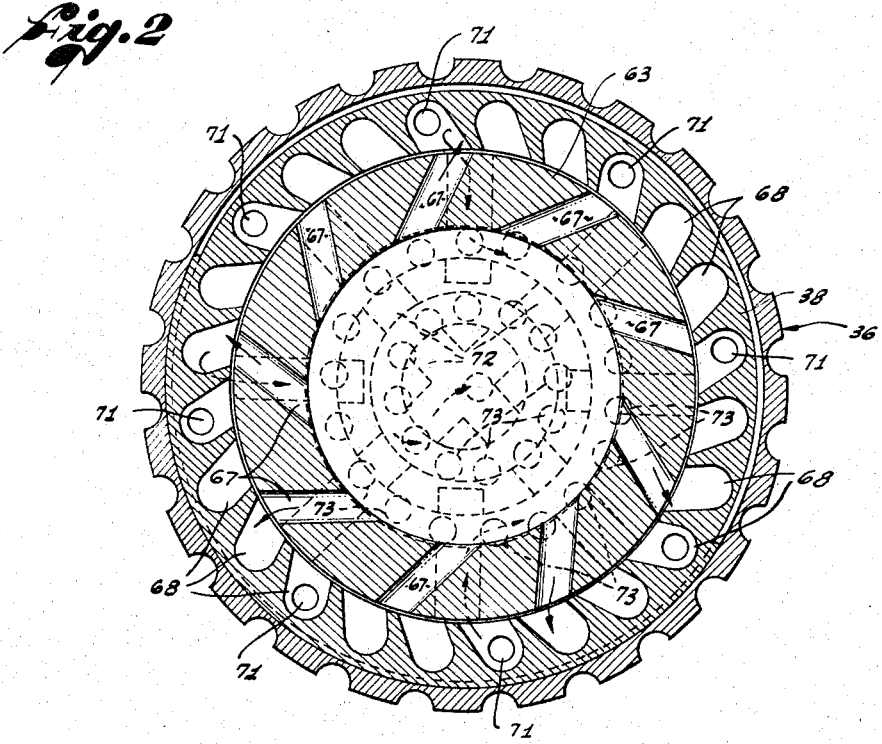
FIGURE 2 is a transverse sectional view taken on the line 2—2 of FIGURE 1.

As the operating fluid leaves the channels or passages 67, it flows into turbine pockets or cups 68 in the interior surface of the sleeve 36 and operates on the sleeve 36 to apply a torque in a clockwise direction, as viewed in FIGURE 2, the ring 63 and the lower portion of the sleeve 36 thereby providing self-driven, contra-rotating turbines.

The drilling mud or other operating fluid leaves the turbine cups or pockets 68 in the sleeve 36 in several directions. A portion passes upwardly directly from the pockets 68 to the outside of the drill bit through vertical passages 69. Another portion passes directly from the pockets 68 to the cutting elements 42 through the passages 71. A third portion returns inwardly from pockets 68 into interconnected passageways 72 in the turbine ring 63, whence it passes through vertical holes 73 to the cutting surface at the cutting elements 65.

It will therefore be seen that the drilling mud or other operating fluid passes through the offset turbine passages 67 to give a counterclockwise torque to the turbine ring 63 and through the pockets 68 to give a clockwise torque to the sleeve 36, as viewed in FIGURE 2. Since the turbine ring 63 rigidly supports the central cutting elements 65 and the sleeve 36 rigidly supports the rim cutting elements 42, contra-rotation of the center and rim portions of the drill bit is provided for. The interconnection of the drill bit portions insures that contra-rotation will be at a positive relative rate and that neither portion may stall without being effected by the torque exerted on the other. Thus, turbine ring 63 is connected to sleeve 53 which is in turn keyed to sleeve 31 and sleeve 31 and sleeve 36 are interconnected by the bevel gears 34 and 35, respectively, through the conical gears 28 so that the central and outer portions of the drill bit will always rotate in reverse directions at the same rotary speed.

The relative areas of the central and rim cutting portions of the drill bit, exemplified by the cutting elements 65 and 42, are proportioned with respect to their mean distances from the axis of rotation of the drill bit so that substantially similar cutting torques are provided by the contra-rotating portions of the bits.

The impacting action of the bit will now be described. As the ring 48 on the sleeve 36 rotates in a clockwise direction and the flange 58 on the sleeve 53 rotates in a counterclockwise direction, the balls 51 and 52 must pass each other and since they are vertically aligned and overlapping, this produces relative axial movement between the ring 48 and the flange 58 and therefore between the rim and center portions of the drill bit. As can be seen in FIGURE 3, a large number of balls 51 may be placed in pockets annularly arranged in the undersurface of the ring 48. A comparable number of balls 52 are likewise located in pockets in the upper surface of the flange 58 on the sleeve 53. The force on the drill bit tends to move the parts 48 and 53 together, as shown in FIGURE 3, when the relative positions of the balls permits, as in that figure where the axes of the balls 52 lie substantially intermediate the axes of the balls 51.

It will be assumed that the ring 48 is rotating in the direction of the arrow A and the sleeve 53 in the direction of the arrow B. Each time the balls 51 and 52 engage, axial relative movement between the sleeve 36 and cutting elements 42 as one unit and sleeve 53 and cutting elements 65 as another unit must occur to the maximum displacement shown in FIGURE 4; the parts immediately thereafter re-approaching each other into the position of FIGURE 3. The relative rotation between the inner and outer portions of the drill bit and the interfering balls 51, 52, thus give rapid repeated impacts to the cutting elements of the drill bit, the frequency of which can be regulated by the number of balls, the relative speed of rotation and the number of cutting elements on the drill bit portions.

As previously stated, these impacts not only force the cutting elements into the drilling surface of the bore being drilled, but also are believed to set up rapid shock waves at the determined frequency which operate to crystallize the rock material beyond the cutting elements so that it may be more readily separated from the main body of the material in which the cutting elements operate. The resulting cutting, tearing and crystallizing actions, occurring as an incident to the self-rotation of the drill bit, interact to increase the efficiency and speed of the cutting operation.

The rotary drill bit according to the present invention may be readily adapted to use for standard core drilling, for use with conventional rotary core bits, hole openers and casing mills by mounting suitable auxiliaries to either the inner or outer drill bit portions at the threaded mountings 64 or 39.

While certain preferred embodiments of the invention have been specifically illustrated and described, it will be understood the invention is not limited thereto as many variations will be apparent to those skilled in the art, and the invention is to be given its broadest interpretation within the terms of the following claims.

I claim:

1. A drill bit comprising: a central cutting portion having a generally circular outer circumference concentric with its longitudinal axis; an outer cutting portion of generally annular form concentric with and closely surrounding said central portion without passageway therebetween, said portions being mounted and supported to rotate about the same longitudinal axis of the drill bit; means for effecting rotation of said drill bit portions in opposite directions; and vertically interfering means on said oppositely rotating drill bit portions operating to give rapid repeated impacts thereto for transmittal from the cutting portions to the drilling surface of a bore being drilled.

2. A drill bit comprising: a central cutting portion having a generally circular outer circumference concentric with its longitudinal axis; an outer cutting portion of generally annular form concentric with and closely surrounding said central portion without passageway therebetween; means mounting and supporting said portions for rotation about the same longitudinal axis of the drill bit; means interconnecting said drill bit portions so that rotation thereof is positively effected in opposite directions; means for effecting rotation of said drill bit portions; and vertically interfering means on said oppositely rotating drill bit portions operating to give rapid repeated impacts thereto for transmittal from the cutting portions to the drilling surface of a bore being drilled.

3. A drill bit comprising: a central cutting portion having a generally circular outer circumference; an outer cutting portion of generally annular form closely surrounding said central portion, said cutting portions being mounted and supported to rotate about the longitudinal axis of the drill bit and including mounting means providing for limited relative axial movement between said cutting portions; means for effecting contra-rotation of said drill bit cutting portions; and vertically interfering means mounted respectively on means rigid with said drill bit cutting portions and engaging to effect relative axial movement therebetween to transmit rapid repeated impacts from the drill bit cutting portions to the drilling surface of a bore being drilled.

4. A drill bit comprising: a central cutting portion having a generally circular outer circumference concentric with its longitudinal axis; an outer cutting portion of generally annular form concentric with and closely surrounding said central portion without passageway therebetween, said portions being mounted and supported for rotation about the same longitudinal axis of the drill bit; means positively interconnecting said drill bit portions so that rotation thereof is effected in opposite directions; turbine means mounted on at least one of said drill bit portions and acting to effect rotation thereof upon passage of a working fluid through the turbine means; and means connecting said drill bit turbine means through a supporting pipe string to a source of working fluid under pressure.

5. A drill bit comprising: a central cutting portion having a generally circular outer circumference concentric with its longitudinal axis; an outer cutting portion of generally annular form concentric with and closely surrounding said central portion without passageway therebetween, said portions being mounted and supported to rotate about the same longitudinal axis of the drill bit; a turbine means mounted on each of said drill bit cutting portions and acting to effect rotation of said portions on the passage of a working fluid therethrough, said turbine means operating to apply torques to said drill bit portions in opposite directions for contra-rotation thereof; and means connecting said turbine means in succession through a supporting pipe string to a source of working fluid under pressure.

6. The drill bit defined in claim 5 in which said drill bit cutting portions are positively interconnected to effect contra-rotation thereof at the same speed.

7. A drill bit comprising: a central cutting portion having a generally circular outer circumference concentric with its longitudinal axis; an outer cutting portion of generally annular form concentric with and closely surrounding said central portion without passageway therebetween, said portions being mounted and supported to rotate about the same longitudinal axis of the drill bit; means interconnecting said drill bit portions so that rotation thereof is effected in opposite directions at a constant relative rate; turbine means on both said central and outer cutting portions of said drill bit operating on the passage of a working fluid therethrough to apply oppositely directed torques to said drill bit portions; and means connecting said turbine means in series to pass a working fluid from a supporting pipe string, first through the turbine means in the central drill bit portion, then through the turbine means in the outer drill bit portion, and thence to the drilling surface.

8. A drill bit comprising: a central cutting portion having a generally circular outer circumference concentric with its longitudinal axis; an outer cutting portion of generally annular form concentric with and closely surrounding said central portion without passageway therebetween, said portions being mounted and supported for rotation about the same longitudinal axis of the drill bit; means positively interconnecting said drill bit portions so that rotation thereof is effected in opposite directions; turbine means mounted on at least one of said drill bit portions and acting to effect rotation thereof upon passage of a working fluid through the turbine means; means connecting said drill bit turbine means through a supporting pipe string to a source of working fluid under pressure: and vertically interfering means on said oppositely rotating drill bit portions engaging in rapid succession to give rapid repeated impacts for transmittal from the cutting portions of the drill bit to the drilling surface of a bore being drilled.

9. A drill bit comprising: a central cutting portion having a generally circular outer circumference concentric with its longitudinal axis; an outer cutting portion of generally annular form concentric with and closely surrounding said central portion without passageway therebetween, said portions being mounted and supported to rotate about the same longitudinal axis of the drill bit; a turbine means mounted on each of said drill bit cutting portions and acting to effect rotation of said portions on the passage of a working fluid therethrough, said turbine means operating to apply torques to said drill bit portions in opposite directions for contra-rotation thereof; means connecting said turbine means in succession through a supporting pipe string to a source of working fluid under pressure; and vertically interfering means on said contra-rotating drill bit portions engaging in rapid succession to give rapid repeated impacts for transmittal from the cutting portions of the drill bit to the drilling surface of a bore being drilled.

10. A drill bit comprising: a central cutting portion having a generally circular outer circumference concentric with its longitudinal axis; an outer cutting portion of generally annular form concentric with and closely surrounding said central portion without passageway therebetween, said portions being mounted and supported to rotate about the same longitudinal axis of the drill bit; means interconnecting said drill bit portions so that rotation thereof is effected in opposite directions at a constant relative rate; turbine means on both said central and outer cutting portions of said drill bit operating on the passage of a working fluid therethrough to apply oppositely directed torques to said drill bit portions; means connecting said turbine means in series to pass a working fluid from a supporting pipe string, first through the turbine means in the central drill bit portion, then through the turbine means in the outer drill bit portion, and thence to the drilling surface; and vertically interfering means on said oppositely rotating drill bit portions engaging in rapid succession to give rapid repeated impacts for transmittal from the cutting portions of the drill bit to the drilling surface of a bore being drilled.

11. A drill bit comprising: a central cutting portion having a generally circular outer circumference concentric with its longitudinal axis; an outer cutting portion of generally annular form concentric with and closely surrounding said central portion without passageway therebetween, said drill bit portions being mounted and supported to rotate about the same longitudinal axis of a drill bit; opposed gear rings on said drill bit portions; idler gears meshing with said gear rings to effect concurrent positive contra-rotation of the drill bit portions; and means for effecting rotation of said drill bit portions.

12. A drill bit comprising: a central cutting portion having a generally circular outer circumference concentric with its longitudinal axis; an outer cutting portion of generally annular form concentric with and closely surrounding said central portion without passageway therebetween, said drill bit portions being mounted and supported to rotate about the same longitudinal axis of a drill bit; opposed gear rings on said drill bit portions; idler gears meshing with said gear rings to effect concurrent positive contra-rotation of the drill bit portions; means for effecting rotation of said drill bit portions; and vertically interfering means on said contra-rotating drill bit portions engaging to give rapid repeated impacts thereto for transmittal from the cutting portions to the drilling surface of a bore being drilled.

13. A drill bit comprising: a central cutting portion having a generally circular outer circumference concentric with its longitudinal axis; an outer cutting portion of generally annular form concentric with and closely surrounding said central portion without passageway therebetween, said drill bit portions being mounted and supported to rotate about the same longitudinal axis of a drill bit; opposed gear rings on said drill bit portions; idler gears meshing with said gear rings to effect concurrent positive contra-rotation of the drill bit portions; turbine means on both of said drilling bit portions receiving an operating fluid in succession to apply contra-rotation torques to said drill bit portions; and means connecting said turbine means to the bore of a supporting pipe string for the drill bit.

14. The drill bit defined in claim 13 in which the working fluid is a drilling mud and including passageways for transmitting the mud from the last turbine means to the cutting surface of the drill bit.

15. A drill bit comprising a central cutting portion having a generally circular outer circumference; an outer cutting portion of generally annular form closely surrounding said central portion; means mounting said drill bit portions for rotation about the longitudinal axis of the drill bit, said mounting means including means providing limited axial movement between said central and outer drill bit portions; resilient cushioning means for connecting said drill bit to a supporting pipe string; opposed horizontal surfaces on said drill bit portions; pockets in said surfaces; rolling means in said pockets having diameters to interfere vertically as the opposed horizontal surfaces contra-rotate with the drill bit portions on which they are mounted; and means for effecting contra-rotation of said drill bit portions whereby said interfering rolling means give rapid repeated impacts for transmittal from the drill bit cutting portions to the drilling surface of the bore being drilled.

16. The drill bit defined in claim 15 in which said central drill bit cutting portion is keyed for free limited axial movement and in which said drill bit cutting portion has axial movement relative to the pipe string support through said resilient cushion connection.

References Cited
UNITED STATES PATENTS

| | | | |
|---|---|---|---|
| 2,184,066 | 12/1939 | Zublin | 175—96 X |
| 2,201,680 | 5/1940 | Haynes | 15—104.06 |
| 2,243,005 | 5/1941 | Good | 15—104.12 |
| 2,710,980 | 6/1955 | Pletcher | 15—104.12 |
| 2,750,154 | 6/1956 | Boice | 175—106 X |
| 2,937,008 | 5/1960 | Whittle | 175—106 X |
| 3,077,936 | 2/1963 | Arutunoff | 175—107 X |

CHARLES E. O'CONNELL, *Primary Examiner.*

NILE C. BYERS, JR., *Examiner.*